UNITED STATES PATENT OFFICE.

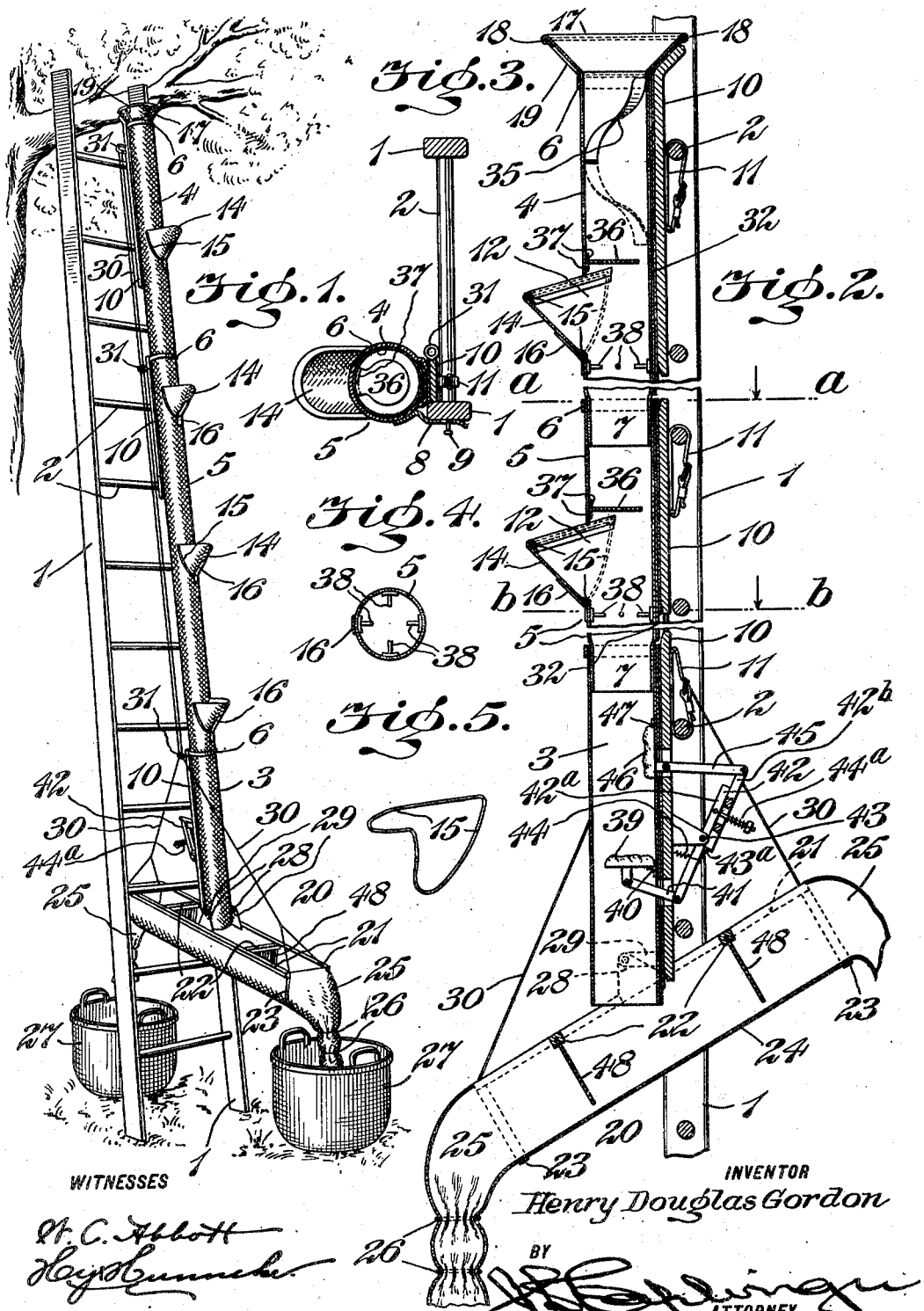

HENRY DOUGLAS GORDON, OF IDLEWILD, NEW YORK.

FRUIT-CONVEYER.

967,365.  Specification of Letters Patent. Patented Aug. 16, 1910.

Application filed December 31, 1909. Serial No. 535,826.

*To all whom it may concern:*

Be it known that I, HENRY DOUGLAS GORDON, a citizen of the United States, and a resident of Idlewild, in the county of Orange and State of New York, have invented certain Improvements in Fruit-Conveyers, of which the following is a specification.

This invention relates to certain improvements in that class of devices which are especially designed and adapted for employment during the picking of fruit and the like, for conveying such fruit from the trees to baskets or other receptacles, and the object of the invention is to provide a device of this general character of a simple and comparatively inexpensive nature, and of a light and strong construction, having certain features of novelty and improvement, whereby the practical use of the device is facilitated in such a manner as to lessen and expedite the labor and time consumed in picking the fruit and transporting the device from tree to tree, without undue liability of bruising or otherwise damaging such fruit.

The invention consists in certain novel features of the construction, and combinations and arrangements of the several parts of the improved fruit conveyer, whereby damage to the fruit is effectively guarded against and certain other important advantages are attained, and the device is rendered simpler, less expensive, and otherwise better adapted and more convenient for use, all as will be hereinafter fully set forth.

The novel features of the invention will be carefully defined in the claims.

In order that my invention may be the better understood, I will now proceed to describe the same with reference to the accompanying drawings which illustrate one embodiment of the improved fruit conveyer, in which drawings—

Figure 1 is a perspective view, drawn to a small scale and showing a fruit conveyer constructed according to my invention as it appears during use; Fig. 2 is an enlarged fragmentary section taken vertically and axially through the fruit conveyer, and illustrating certain features of construction to be hereinafter referred to; Fig. 3 is a transverse section taken through the device in the plane indicated by the line *a—a* in Fig. 2; Fig. 4 is a transverse section taken in the plane indicated by the line *b—b* in Fig. 2, the ladder being, however, omitted, and Fig. 5 is a perspective view showing one of the reinforcements for the fruit-receiving lips or pockets detached and enlarged.

In these views I have shown the improved fruit conveyer constructed according to my invention applied for practical use in connection with a ladder having stiles 1, 1 and rungs 2, 2, the device being so applied thereto as to be extended parallel with one of the stiles of the ladder so as to be out of the way of the person ascending or standing upon the rungs while being at the same time conveniently accessible to receive the fruit as the same is picked, and being secured to the ladder in such a way as to be capable of being readily transported from tree to tree as the ladder is moved from place to place in the orchard, whereby it will be understood that a material saving in time and labor is accomplished during the practical use of the device in picking fruit. As shown in these views, the improved fruit conveyer is provided with a body portion made in the form of an elongated tube or chute from canvas or other suitable and preferably flexible material, extended parallel with the stile 1 of the ladder and detachably secured in position so as to be capable of removal when it is desired to use the ladder for other purposes, or to apply the conveyer to different ladders, and being provided at intervals along its length with fruit receiving lips or pockets indicated at 14, 14 on the drawings, so that the person standing upon the ladder may conveniently drop the fruit as the same is picked from the tree into one or another of such pockets without the necessity of ascending or descending the ladder to render such pockets accessible. As shown herein, the body portion of the device is also made sectional, so as to be capable of such longitudinal adjustment as may be required to accommodate the device to ladders of different lengths, or to position the device at different points upon the same ladder, such body portion being herein shown as formed from a lower section 3, an intermediate section 5, and an upper section 4, such sections being alined and joined together, end to end, so as to produce a substantially continuous tube or chute to be traversed by the fruit dropped into the device. It is obvious that this structure permits of dispensing with the intermediate section, if the fruit to be picked hangs low or the ladder to which the device is applied is short, and also permits of inserting a number of such intermediate sections 5, similar to each other and joined end to end, between the upper and lower sections 4 and 3.

As shown in the drawings, each of the several tubular sections 3, 4 and 5 is provided at its upper end with a peripheral annular reinforcement or strip 6, which may be formed conveniently from leather or other suitable material adapted to withstand the wear imposed upon it, and serving to maintain the said upper ends of such sections sufficiently open to receive within them the lower extremities of the superposed sections as indicated at 7 upon the drawings. It will be evident that the reinforced upper end of the upper section 4 is adapted to receive the lower end of a superposed section in this manner although such arrangement will not ordinarily be necessary. The reinforcements or bands 6, 6 provided in this way upon the sections afford a convenient situation in which to locate an attachment to the ladder stile, as shown in Fig. 3, such attachment being in the form of a strip 8 extended from the reinforcement 6 and apertured for engagement with a nail or pin 9 upon the stile 1 of the ladder, so as to retain the several sections of the conveyer closely alongside such stile, while permitting the same to be readily detached from the ladder whenever desired. The upper end of each section 3, 4 and 5 as herein shown is also provided with a longitudinally extended reinforcement 10 made in the form of a short flattened strip of wood or the like, secured along that surface of the conveyer which is intended to adjoin the ladder during use, and of a length adapted to bridge across the space between two adjacent rungs 2, 2 in such a way as to assist in alining the sections with each other, and each of these longitudinal reinforcements 10 is shown provided with a fastening 11, engageable with one of the rungs 2 for holding the sections securely in position for use. Such fastenings 11 are herein shown in the form of straps having buckles so that they may be detachably engaged over the rungs as indicated in Figs. 2 and 3.

The fruit receiving lips or pockets 14, 14 may be located in any desired fashion upon the body portion, or may be omitted altogether without departure from the broad idea of my invention. Each such pocket or lip 14 as shown herein is formed from a piece of canvas or the like so inserted in the tube as to afford a projecting lip or pocket open as shown at 12 so that the fruit may be conveniently dropped through such opening into the bore or hollow of the conveyer so as to traverse the length thereof and be deposited in the receptacle, as will be hereinafter explained. Where the lips or pockets 14 are produced from canvas, as is desirable to permit the device to be compactly arranged for storage or shipment, I prefer to provide a resilient reinforcement 15 for the upper edge thereof adapted to operate as a spring to retain the pocket or lip in opened position when the device is set up for use while permitting the same to be flattened down when desired. Such reinforcement may be conveniently made from a piece of resilient wire or the like as shown at Fig. 5. A light spring 16 is also preferably provided at the junction of the lip 14 with the body portion of the conveyer to retain such pocket thrown out to the positions shown in Figs. 1, 2 and 3.

As shown the lower section 3 has no pockets 14, but it is evident that such pockets may be provided therefor if desired and the upper section may be unprovided with pockets. Said upper section is also shown provided with an expanded mouth or lip 17 affording a pocket at the upper end of the conveyer for the reception of fruit, a resilient reinforcement 18 being provided around the margin of such lip, with depending parts 19 normally retaining the lip in expanded condition as shown, but permitting the same to be flattened if desired. If the conveyer be short, the pockets 14 may be omitted and the mouth or pocket 17 be employed exclusively for the reception of fruit.

At the lower part of the tubular body portion of the device, below the lower section 3 I have shown a delivery member 20 adapted to receive the fruit emerging from the lower end of said body portion and to deliver the same into a receptacle arranged to receive it. The delivery member 20 shown in the drawings is adjustable in order that it may be set at any desired angle, and is reversible so that the fruit may be delivered through it in different directions to different receptacles, so that when one basket or receptacle is filled, the fruit traversing the body portion may be directed to another basket or receptacle. Two such baskets are shown at 27 in Fig. 1, it being understood that when one basket is removed from beneath the delivery member after being filled with fruit, a fresh empty basket is positioned in its stead. The delivery member 20 is herein shown formed with two parallel frame bars or strips 21, 21 suitably spaced apart and tied at intermediate portions by transverse cleats or braces 22, 22, and at their ends by downwardly bent strips 23, 23 which may be conveniently formed from metal, a sheet of canvas or other suitable material being extended as shown at 24 in trough-like shape between said strips or bars 21, 21 with its ends supported by the downwardly bent strips 23, 23 in such a way as to have its central portion positioned beneath the open lower end of the lower member or section 3 of the body portion to receive the fruit discharged therefrom. The canvas or other sheet 24 will be sufficiently soft and yielding, particularly at its central part as to avoid liability of bruising the fruit. The opposite ends of the delivery member 20 are provided with tubular discharge members 25, 25 which may be conveniently formed from the extremities of the canvas or other sheet 24, and which depend below the trough like central portion of said member 20 so that when the same is set at an inclination, as indicated in Figs. 1 and 2, the fruit discharged thereto will be dropped into the baskets or receptacles 27. Elastic bands 26 are passed around these members 25, 25 to retard the discharge of the fruit and prevent the same from descending into the basket or receptacle with such force as might bruise or injure it. The cleats or braces 22, 22 also carry retarding devices 48, 48 positioned at opposite sides of the mouth of the body portion to prevent the fruit from rebounding from the delivery member, and also operating to slightly retard the travel of the fruit along the inclined trough like central part of the member. Such retarding devices are illustrated as made in the form of pendent pieces of leather 48, slitted vertically in such a way as to permit the passage of the fruit along member 20.

To lessen the liability of bruising the fruit during its passage downward through the tubular body portion of the device, I have shown that side of said body portion which adjoins the ladder during use provided with an internal padded surface 32, sufficiently soft to prevent damage to the fruit rolling down over the boards 10 and ladder rungs 2, 2. If desired, this padded or cushioned surface may be limited to those parts of the chute sections or members which intervene between the boards or reinforcements 10, 10, since there is greater liability of injury to the fruit by contact over the ladder rungs.

I have shown the mouth portion of the upper section or member 4 provided with an auxiliary retarding device in the form of a spirally arranged canvas strip 35 sewed to the inner surface of said member, and adapted to retard or impede the descent of the fruit dropped into the mouth of the conveyer in order to control the speed at which such fruit descends, and above each lip or pocket 14 I have also provided an auxiliary retarding device 36 in the form of a flexible canvas valve, one edge of which is split as shown at 37, so as to produce upwardly and downwardly directed parts which are stitched to the wall of the body portion above each opening 12 to further retard or impede the descent of the fruit. Beneath each such pocket 14 I have also provided auxiliary retarding devices in the form of flexible pins 38, 38 of rubber or the like secured to the walls of the body portion and projecting in the path of the fruit to control the rapidity of its descent through the conveyer. These several devices may be omitted if desired, particularly in the event that the conveyer is positioned at a considerable angle to the vertical. Where employed, they may be variously positioned in the length of the body portion.

I have also shown the body portion provided near its lower end with controlling means adapted to control the discharge of the fruit therefrom to the delivery member 20, such means including a lower padded member or valve 39, hinged at 40 to one wall of member or section 3 and extended in position to be encountered by the descending fruit, which thereupon operates to swing said valve downwardly. This valve has connection by a link 41 with the lower end of a jointed lever 42 pivoted at 43 and coupled with a spring 44 operating to hold said valve normally in the path of the fruit. This lever 42 comprises two sections 42$^a$ and 42$^b$ pivotally connected as seen at 43$^a$ and normally pressed together by a spring 44$^a$. The upper section 42$^b$ of the lever 42 is coupled by a link 45 with a similar padded member or valve 46 hinged at 47 to the wall of section or member 3 but normally pressed by springs 44 and 44$^a$ against the wall thereof out of the path of the descending fruit. By this arrangement, an apple or the like descending the chute and contacting with member 39 swings the same downwardly, the lever connection with valve member 46 operating in a substantially automatic manner to project the same into the path of the next succeeding apple so as to retard the same to an extent sufficient to permit the first apple to roll down the trough-like delivery member out of the way so that it shall not be damaged by the striking of such succeeding apple upon it, while, should the succeeding apple be in the path of said valve member 46, the spring 44$^a$ permits the section 42$^b$ of lever 42 to flex outwardly when the lower section 42$^a$ is moved by contact of the lower apple upon the lower valve member 39, whereby clogging of the tubular body portion is effectively prevented. Such controlling means may, if desired, be omitted, or may be substituted for the retarding devices 35, 36 or 38, being then duplicated at intervals along the body portion.

As shown in the drawings, the delivery member 20 is pivotally supported in order that it may be adjusted and reversed to different inclinations, being for this purpose provided with spaced lugs 28, 28 upon the bars or strips 21, 21 which are pivoted upon arms 29, 29 extended from the lower board 10 at opposite sides of the lower member or section 3 of the body portion, and the pivotal adjustment of said member 20 is controlled by flexible connections 30, 30 or the like, extended from its opposite ends upwardly along the side of the body portion to the upper part thereof where they are engaged with an eye 31 upon the upper board 10. Other eyes 31 guide these connections at lower points upon the body portion. By this means, if one basket be filled with fruit, the user of the device standing at any point on the ladder, may draw upon these connections 30 in such a manner as to reverse the inclination of the delivery member 20 so that the fruit will thereafter be directed to another basket.

From the above description it will be seen that the improved fruit conveyer constructed according to my invention is of an extremely simple, and comparatively inexpensive nature, and is particularly well adapted for use by reason of the convenience with which it may be transported from tree to tree and of the facility with which the fruit is conveyed to the baskets or other receptacles without liability of injury, and it will also be obvious from the above description that the device is susceptible of some modification without material departure from the principles and spirit of the invention, and for this reason I do not desire to be understood as limiting myself to the precise form and arrangement of the several parts of the device as herein set forth in carrying out my invention in practice.

Having thus described my invention, what I claim and desire to secure by Letters Patent is—

1. A fruit conveyer having a body portion provided with a passage adapted to be traversed by fruit, a plurality of movably supported members extended inwardly from the walls of said passage and adapted for successive engagement with the fruit traversing the same, said members being spaced apart at intervals along the length of the passage, and means for communicating movement from one member to the other.

2. A fruit conveyer having a body portion adapted to be traversed by fruit, a plurality of pivoted members within the conveyer, adapted for engagement with the fruit traversing the body section, and means for successively moving said members into operative position.

3. A fruit conveyer having a body portion adapted to be traversed by fruit, a plurality of pivoted members within the conveyer, adapted to be engaged with and moved by the fruit traversing the body section, and means for communicating such movement from one member to the other.

4. A fruit conveyer having an elongated body portion adapted to be traversed by fruit, a plurality of movable supported members adapted for engagement with the fruit traversing the body portion, and means for normally holding one of said members in the path of travel of the fruit and the remainder of such members out of the path.

5. A fruit conveyer having a body portion adapted to be traversed by fruit, a plurality of pivoted members extended within said body portion and levers connecting said members in a manner for communicating movement of one such member to another.

6. A fruit conveyer having a body portion adapted to be traversed by fruit, pivoted members within the body portion, links engaging the pivoted members, and projecting exteriorly of the body portion and a pivoted lever in engagement with the links whereby the movement of one member imparts movement to another member.

7. A fruit conveyer having a body portion adapted to be traversed by fruit, pivoted members within the body portion, links engaging the pivoted members and projecting exteriorly of the body portion and a pivoted lever in engagement with the links, said lever being formed in two sections having movement, one with relation to the other, to permit flexure of said lever.

8. A fruit conveyer having a body portion adapted to be traversed by fruit, pivoted members within the body portion, links engaging the pivoted members and projecting exteriorly of the body portion, and a pivoted lever in engagement with the links, and means engaging the lever to hold one of the members normally in the path of the fruit.

9. A fruit conveyer having a body portion adapted to be traversed by fruit, pivoted members within the body portion, links engaging the pivoted members and projecting exteriorly of the body portion, and a pivoted lever in engagement with the links, and a spring engaging the lever to hold one of the members normally in the path of the fruit.

10. A fruit conveyer having a ladder, an elongated chute member extended along said ladder and adapted to be traversed by fruit, said chute being formed of telescopic sections, and means carried by each section engageable with the ladder to hold the sections against displacement with relation one to the other.

11. A fruit conveyer having a ladder, an elongated chute member, extended along said ladder and adapted to be traversed by fruit, said chute being formed of telescopic sections, and means projecting from the upper end portion of each section engageable with the ladder to hold the sections against displacement with relation one to the other.

12. A fruit conveyer having a ladder, an elongated chute member extended along one side thereof and adapted to be traversed by fruit, said conveyer comprising a plurality of telescopic sections and a retaining means for each section adapted for engagement with a rung of the ladder to hold said sections against displacement one with relation to the other.

13. A fruit conveyer having a ladder, an elongated chute member extended along one side thereof, and adapted to be traversed by fruit, a delivery member supported for movement with relation to the chute into which the chute discharges and means engaging the delivery member extending along the chute for imparting movement to said delivery member from different positions on the ladder.

14. A fruit conveyer having a ladder, an elongated chute member extended along said ladder and adapted to be traversed by fruit, said chute being formed of telescopic sections, a reinforcement for each of the sections and means carried by the reinforcement of each section engageable with the ladder to hold the sections against displacement one with relation to the other.

15. A fruit conveyer having a ladder, an elongated chute member extended along one side thereof, and adapted to be traversed by fruit, said conveyer comprising a plurality of telescopic sections, a reinforce member for each of the sections extended longitudinally thereof, and of a length to intersect adjacent rungs of the ladder and means carried by such reinforce engaging the rungs of the ladder to hold the sections against displacement one with relation to the other.

In witness whereof I have hereunto signed my name this fourteenth day of December 1909, in the presence of two subscribing witnesses.

HENRY DOUGLAS GORDON.

Witnesses:
BESSIE Y. GORDON,
HENRY R. GORDON.